(12) United States Patent
Ramsay (10) Patent No.: US 9,151,649 B2
(45) Date of Patent: *Oct. 6, 2015

(54) ULTRASONIC FLOW METERING SYSTEM WITH AN UPSTREAM PRESSURE TRANSDUCER

(71) Applicant: DANIEL MEASUREMENT AND CONTROL, INC., Houston, TX (US)

(72) Inventor: Lawson Hamilton Ramsay, Falkirk (GB)

(73) Assignee: DANIEL MEASUREMENT AND CONTROL, INC., Houston, TX (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/928,670

(22) Filed: Jun. 27, 2013

(65) Prior Publication Data

US 2014/0109686 A1    Apr. 24, 2014

Related U.S. Application Data

(60) Provisional application No. 61/716,164, filed on Oct. 19, 2012.

(51) Int. Cl.
    *G01F 1/66* (2006.01)
    *G01F 25/00* (2006.01)

(52) U.S. Cl.
    CPC . *G01F 1/66* (2013.01); *G01F 25/00* (2013.01)

(58) Field of Classification Search
    CPC ..... G01M 3/3815; G08B 17/04; G01F 1/667; G01F 1/662
    USPC ............................ 702/99; 374/117; 73/861.18
    See application file for complete search history.

(56) References Cited

U.S. PATENT DOCUMENTS

| 6,345,536 | B1 | 2/2002 | Morrison et al. |
| 6,651,514 | B2 | 11/2003 | Zanker |
| 2006/0277000 | A1 | 12/2006 | Wehrs |
| 2014/0109645 | A1* | 4/2014 | Ramsay ......................... 73/1.34 |
| 2014/0109689 | A1* | 4/2014 | Ramsay ...................... 73/861.28 |
| 2014/0109690 | A1* | 4/2014 | Ramsay et al. ............. 73/861.28 |
| 2015/0000420 | A1* | 1/2015 | Ramsay ...................... 73/861.01 |

FOREIGN PATENT DOCUMENTS

| JP | 2004-226144 A | 8/2004 |
| KR | 10-1178038 B1 | 8/2012 |

OTHER PUBLICATIONS

International Patent Application No. PCT/US2013/065587, PCT International Search Report and Written Opinion dated Feb. 7, 2014 (15 pgs).

* cited by examiner

*Primary Examiner* — Jewel V Thompson
(74) *Attorney, Agent, or Firm* — Conley Rose, P.C.

(57) ABSTRACT

Apparatus and method for monitoring operation of a flow metering system. In one embodiment, a flow metering system includes a flow meter, a first and second pressure sensors, a flow conditioner, and a condition monitor. The flow meter is configured to measure the volume of fluid flowing through the flow meter. The first pressure sensor is disposed proximate the flow meter to measure pressure of the fluid proximate the flow meter. The flow conditioner is disposed upstream of the flow meter. The second pressure sensor is disposed upstream of the flow conditioner to measure pressure of the fluid upstream of the flow conditioner. The condition monitor is coupled to the flow meter and the pressure sensors, and is configured to identify a potential discrepancy in operation of the flow metering system based on a difference between pressure measurements of the first and second pressure sensors.

20 Claims, 5 Drawing Sheets

ULTRASONIC FLOW METERING SYSTEM WITH AN UPSTREAM PRESSURE TRANSDUCER

CROSS REFERENCE TO RELATED APPLICATION

The present application claims priority to U.S. Provisional Patent Application No. 61/716,164, filed on Oct. 19, 2012; which is hereby incorporated herein by reference in its entirety.

BACKGROUND

Natural gas is transported from place-to-place via pipelines. It is desirable to know with accuracy the amount of gas flowing in the pipeline, and particular accuracy is demanded when the fluid is changing hands, or "custody transfer." Even where custody transfer is not taking place, however, measurement accuracy is desirable, and in these situations, flow meters may be used.

Ultrasonic flow meters are one type of flow meter that may be used to measure the amount of fluid flowing in a pipeline. Ultrasonic flow meters have sufficient accuracy to be used in custody transfer. In an ultrasonic flow meter, acoustic signals are sent back and forth across the fluid stream to be measured. Based on parameters of received acoustic signals, the fluid flow velocity in the flow meter is determined. The volume of fluid flowing through the meter can be determined from determined flow velocities and the known cross-sectional area of the flow meter.

An ultrasonic flow metering system is subject to various conditions that affect the calibration, accuracy, and/or operation of the metering system. For example, accumulation of contaminants in the pipeline, flow restrictions, and/or differences or changes in operating environment with respect to calibration environment may affect flow meter accuracy. Accordingly, effective techniques for monitoring conditions related to flow meter system operation and accuracy are desirable.

SUMMARY

Apparatus and method for monitoring flow meter operation are disclosed herein. In one embodiment, a flow metering system includes a flow meter, first and second pressure sensors, a flow conditioner, and a condition monitor. The flow meter is configured to measure the volume of fluid flowing through the flow meter. The first pressure sensor is disposed proximate the flow meter to measure pressure of the fluid proximate the flow meter. The flow conditioner is disposed upstream of the flow meter. The second pressure sensor is disposed upstream of the flow conditioner to measure pressure of the fluid upstream of the flow conditioner. The condition monitor is coupled to the flow meter and the pressure sensors, and is configured to identify a potential discrepancy in operation of the flow metering system based on a difference between pressure measurements of the first and second pressure sensors. In another embodiment, a method for monitoring operation of a flow metering system includes receiving pressure measurements from a first pressure sensor disposed proximate a flow meter and from a second pressure sensor disposed upstream of a flow conditioner that conditions a fluid stream provided to the flow meter. A reference pressure difference between the first and second pressure sensors is established. A potential discrepancy in operation of the flow metering system is identified based on the reference pressure difference and pressure measurements received from the first and second pressure sensors.

In a further embodiment, a condition monitoring system for monitoring operation of a flow metering system includes a reference pressure determination engine and a parameter verification engine. The reference pressure determination engine is configured to acquire pressure measurements from a first pressure sensor disposed proximate a flow meter, and from a second pressure sensor disposed upstream of a flow conditioner that conditions a fluid stream provided to the flow meter. The reference pressure determination engine is further configured to establish a reference pressure difference between the first and second pressure sensors based on the pressure measurements. The parameter verification engine is configured to identify a potential discrepancy in operation of the flow metering system based on the reference pressure difference and pressure measurements received from the first and second pressure sensors.

BRIEF DESCRIPTION OF THE DRAWINGS

For a detailed description of exemplary embodiments of the invention, reference will now be made to the accompanying drawings in which.

NOTATION AND NOMENCLATURE

In the following discussion and in the claims, the terms "including" and "comprising" are used in an open-ended fashion, and thus should be interpreted to mean "including, but not limited to . . . . " In addition, the term "couple" or "couples" is intended to mean either an indirect or a direct electrical connection. Thus, if a first device couples to a second device, that connection may be through a direct electrical connection, or through an indirect electrical connection accomplished via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors. The term "fluid" includes liquids and gases.

DETAILED DESCRIPTION

The following description is directed to various exemplary embodiments of the invention. The drawing figures are not necessarily to scale. Certain features of the embodiments may be shown exaggerated in scale or in somewhat schematic form and some details of conventional elements may not be shown in the interest of clarity and conciseness. The disclosed embodiments should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. It is to be fully recognized that the different teachings of the embodiments discussed below may be employed separately or in any suitable combination to produce desired results. Further, the various embodiments were developed in the context of measuring hydrocarbon flows (e.g., crude oil, natural gas), and the description follows from the developmental context; however, the systems and methods described are equally applicable to measurement of any fluid flow.

Ultrasonic flow metering systems include condition monitors (e.g., condition-based monitoring systems) to enable detection of changes in metering system operation and/or system operating conditions, and correction of conditions causing the changes. An ultrasonic meter condition monitor is a system that monitors the operation of the ultrasonic meter and associated instrumentation. A condition monitor may analyze the operation of the metering system by performing exemplary functions such as:

- detection of changes in flow characteristics such as flow profile, flow symmetry, flow swirl, flow turbulence, etc.
- detection of changes in results of ultrasonic diagnostics such as error rate in the detection of ultrasonic signals, gain levels, noise levels, peakswitch detection, etc.
- comparison of measured speed of sound from the ultrasonic flow meter to gas composition, pressure and temperature using the American Gas Association (AGA) 10 standard;
- comparison of measured temperature against temperature derived from the speed of sound; and
- comparison of density derived from a gas composition sensor (e.g., a gas chromatograph) to density derived from speed of sound.

Because changes in flow pressure affect the accuracy of fluid volume measurements produced by ultrasonic metering, ultrasonic flow metering systems include a pressure sensor proximate the flow meter to provide fluid pressure measurements. Accuracy of the pressure sensor is periodically verified to ensure that metering accuracy is not adversely affected by pressure sensor mismeasurement. In conventional ultrasonic flow metering systems, the accuracy of the pressure sensor is verified with a deadweight tester, or a pump and an additional pressure sensor that has been calibrated at an accredited laboratory. Alternatively, a redundant pressure sensor may be disposed proximate the ultrasonic flow meter with the assumption that the two pressure sensors will not experience common mode failure or drift.

Embodiments of the present disclosure include a pressure sensor upstream of the flow conditioner rather than an additional pressure sensor proximate to (e.g., at or downstream of) the ultrasonic flow meter as in conventional ultrasonic metering systems. The flow metering system disclosed herein applies pressure measurements provided by the upstream pressure sensor to verify operation of the pressure sensor proximate the flow meter and to identify potential changes in operation of the flow conditioner.

Figure 1:
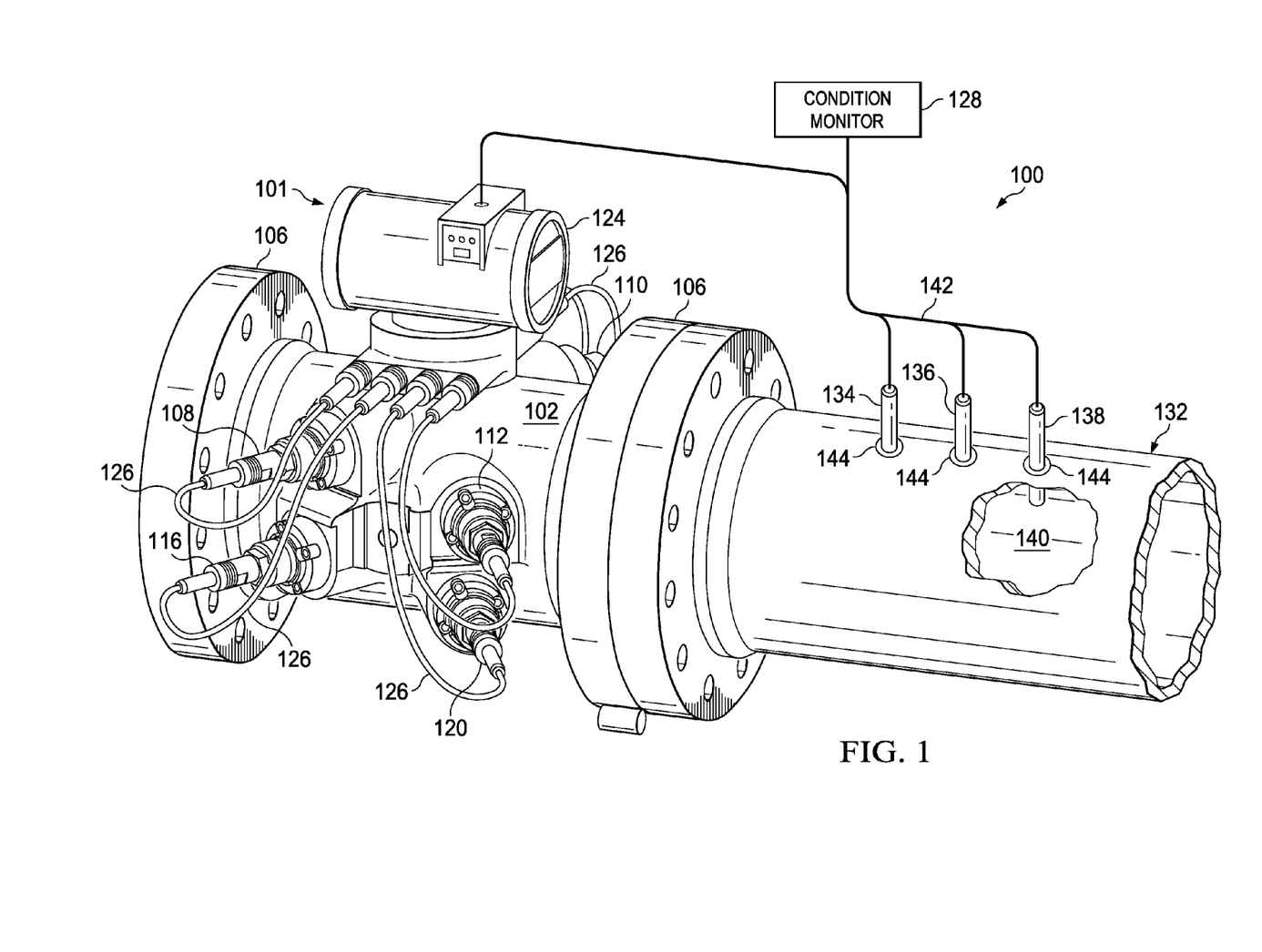
FIG. 1 shows an ultrasonic flow metering system in accordance with various embodiments.

FIG. 1 shows an ultrasonic flow metering system 100 in accordance with various embodiments. The system 100 includes an ultrasonic flow meter 101, sensors 134, 136 138, and a condition monitor 128. In the system 100, the ultrasonic flow meter 101 is coupled to a pipe or other structure 132. In some embodiments, the pipe 132 is disposed downstream of the ultrasonic flow meter 101. The pipe 132 includes openings 144 that allow sensors 134-138 to access the fluid stream flowing through the system 100. The condition monitor 128 is coupled to the sensors 134-138 and to the ultrasonic meter 101. In some embodiments, the condition monitor 128 may be part of a flow computer coupled to the ultrasonic meter 101. In other embodiments, the condition monitor 128 may be integrated with electronics 124 of the ultrasonic meter 101, or implemented as a discrete device.

The ultrasonic flow meter 101 includes a meter body or spool piece 102 that defines a central passage or bore. The spool piece 102 is designed and constructed to be coupled to a pipeline or other structure carrying fluids (e.g., natural gas) such that the fluids flowing in the pipeline travel through the central bore. While the fluids travel through the central bore, the ultrasonic flow meter 101 measures the flow rate (hence, the fluid may be referred to as the measured fluid). The spool piece 102 includes flanges 106 that facilitate coupling of the spool piece 102 to another structure. In other embodiments, any suitable system for coupling the spool piece 102 to a structure may be equivalently used (e.g., weld connections).

In order to measure fluid flow within the spool piece 102, the ultrasonic flow meter 101 includes a plurality of transducer assemblies. In the view of FIG. 1, five such transducers assemblies 108, 110, 112, 116 and 120 are in full or partial view. The transducer assemblies are paired (e.g., transducer assemblies 108 and 110), as will be further discussed below. Moreover, each transducer assembly electrically couples to control electronics package 124. More particularly, each transducer assembly is electrically coupled to the control electronics package 124 by way of a respective cable 126 or equivalent signal conducting assembly.

Figure 2:
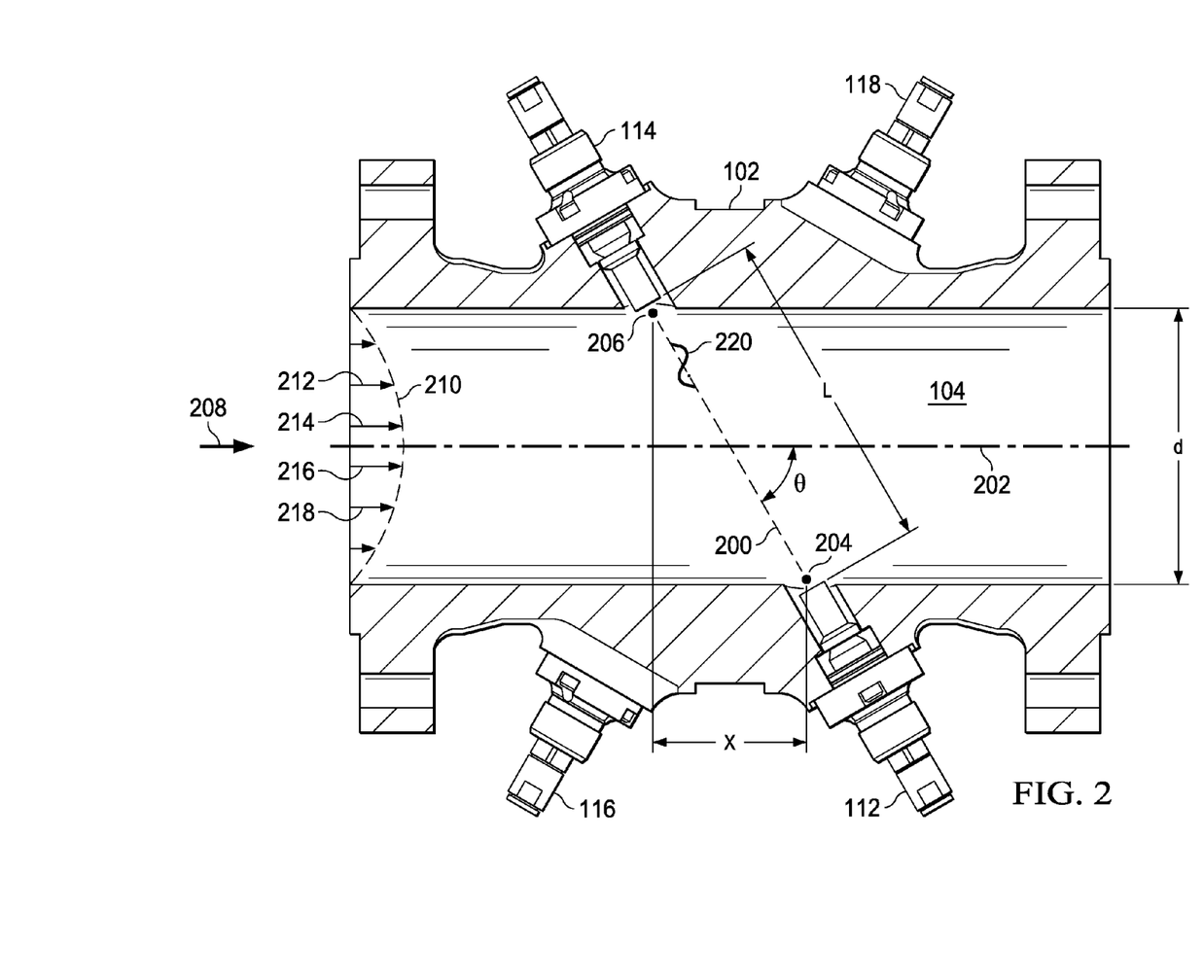
FIG. 2 shows a cross-sectional overhead view of an ultrasonic flow meter in accordance with various embodiments.

FIG. 2 shows a cross-sectional overhead view of the ultrasonic flow meter 101. Spool piece 102 has a predetermined size and defines the central bore 104 through which the measured fluid flows. An illustrative pair of transducers assemblies 112 and 114 is located along the length of spool piece 102. Transducers 112 and 114 are acoustic transceivers, and more particularly ultrasonic transceivers. The ultrasonic transducers 112, 114 both generate and receive acoustic signals having frequencies above about 20 kilohertz. The acoustic signals may be generated and received by a piezoelectric element in each transducer. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the electronics 124 associated with the flow meter 101.

A path 200, also referred to as a "chord," exists between illustrative transducer assemblies 112 and 114 at an angle θ to a centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102 (i.e., the entrance to the spool piece bore). The position of transducer assemblies 112 and 114 may be defined by the angle θ, by a first length L measured between the faces of the transducer assemblies 112 and 114, a second length X corresponding to the axial distance between points 204 and 206, and a third length d corresponding to the pipe inside diameter. In most cases, distances d, X, and L are precisely determined during flow meter fabrication. A measured fluid, such as natural gas, flows in a direction 208 with a velocity profile 210. Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Sometime later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flow meter 101 carrying the fluid, the average velocity over the area of the central bore 104 may be used to find the volume of fluid flowing through the spool piece 102.

Ultrasonic flow meters can have one or more chords. For example, the flow meter 101 includes four chordal paths at varying elevations within the spool piece 102. The flow velocity of the fluid may be determined at each chord to obtain chordal flow velocities, and the chordal flow velocities combined to determine an average flow velocity over the entire pipe. From the average flow velocity, the amount of fluid flowing in the spool piece, and thus the pipeline, may be determined.

Typically, the control electronics 124 causes the transducers (e.g., 112, 114) to fire and receives output signals from the transducers. The control electronics 124 may also compute the mean flow velocity for each chord, compute the mean flow velocity for the meter, compute the volumetric flow rate through the meter, compute speed of sound through the fluid, perform meter diagnostics, etc. The volumetric flow rate and other measured and computed values, such as flow velocity, speed of sound, etc. may be output to the condition monitor 128. As noted above, the condition monitor 128 may be included in the control electronics 124 in some embodiments.

For a given chord, the chordal flow velocity v is given by:

$$v = \frac{L^2}{2X} \cdot \frac{T_{up} - T_{dn}}{T_{up} T_{dn}}, \quad (2)$$

and the chordal speed of sound c is given by:

$$c = \frac{L}{2} \cdot \frac{T_{up} + T_{dn}}{T_{up} T_{dn}} \quad (3)$$

where:
L is the path length (i.e., face-to-face separation between upstream and downstream transducers),
X is the component of L within the meter bore in the direction of the flow, and
$T_{up}$ and $T_{dn}$ are the upstream and downstream transit times of sound energy through the fluid.

The average flow velocity through the meter 101 is given by:

$$v_{avg} = \sum_i w_i v_i \quad (4)$$

where:
$w_i$ is a chordal weighting factor,
$v_i$ is the measured chordal flow velocity, and
the summation i is over all chords.

Returning now to FIG. 1, the sensors 134-138 measure various attributes or parameters of the fluid, and may provide the measurements to the condition monitor 128 via signal conduction media 142 (e.g., wiring). The sensor 134 is a gas composition sensor, such as a gas chromatograph, that provides information indicative of the amount of each constituent of the gas flowing through the system 100. The sensor 136 is a pressure sensor that provides signals indicative of the pressure of the fluid flowing in the system 100. The sensor 138 is a temperature sensor (e.g., a resistance temperature detector) that provides signals indicative of the temperature of the fluid flowing through the system 100. The temperature sensor 138 extends into the interior passage 140 of the pipe 132, and measures the temperature of the fluid flowing through the system 100 at the terminus of sensor 138. Thus, the temperature sensor 138 is positioned to measure the temperature of the fluid at a specific elevation. In FIG. 1, the sensors 134-138 are disposed proximate to and downstream of the ultrasonic flow meter 101. In other embodiments of the system 100, one or more of the sensors 134-136 may be disposed in the spool piece 102.

From the fluid composition, pressure, and temperature information provided by sensors 134, 136, and 138 respectively, the speed of sound through the fluid stream can be computed using predetermined theoretical or experimental values. For example, the condition monitor 128 may compute speed of sound in the fluid as specified in American Gas Association Report No. 10, "Speed of Sound in Natural Gas and Other Related Hydrocarbons" (AGA 10). Some embodiments of the condition monitor 128 may use this computed speed of sound to verify the speed of sound values measured for each chord of the meter 101.

Similarly, based on the speed of sound measurements provided by the ultrasonic flow meter 101 and the measurements provided by the sensors 134, 136, the condition monitor 128 can compute the temperature, pressure, and/or composition of the fluid flowing through the ultrasonic metering system 100. The condition monitor 128 may compute temperature, pressure, and/or composition using an iterative reverse of the speed of sound computation specified by AGA 10 based on the measured speed of sound provided by the ultrasonic meter 101 and measurements provided by the sensors 134-136.

Figure 3:
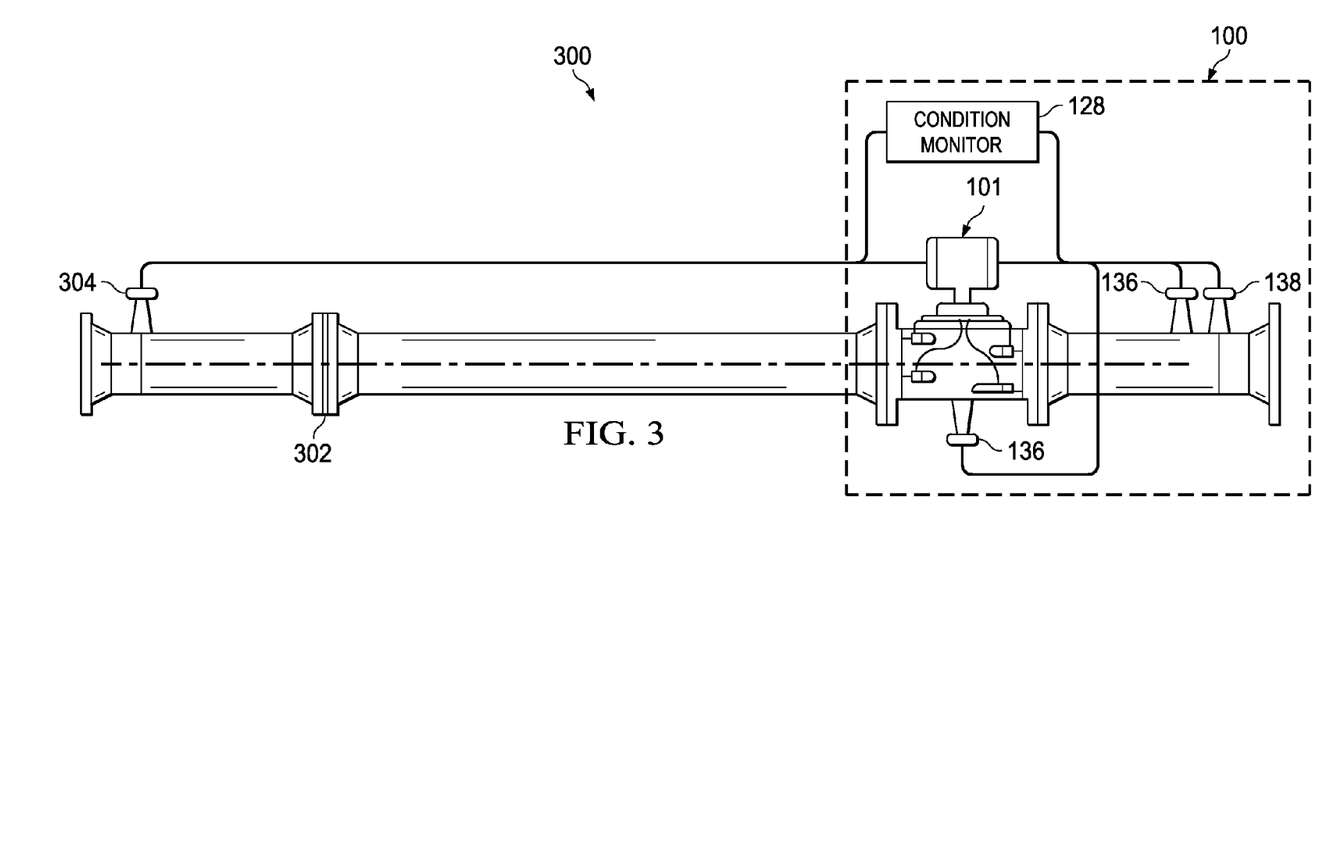
FIG. 3 shows a schematic diagram of an ultrasonic flow metering system including a pressure sensor upstream of a flow conditioner in accordance with various embodiments.

FIG. 3 shows a schematic diagram of an ultrasonic flow metering system 300. The flow metering system 300 includes the flow metering system 100. As explained above, and shown in FIG. 1, the flow metering system 100 includes the ultrasonic flow meter 101, and temperature sensor 138, pressure sensor 136, and gas composition sensor 134 mounted downstream of the ultrasonic meter 101. Some embodiments of the system 300 include a pressure sensor 136 disposed in the spool piece 102 rather than or in addition to the pressure sensor 136 mounted downstream of the ultrasonic meter 101. In other embodiments, the temperature sensor 138 and/or the pressure sensor 136 may be disposed upstream of the flow meter 101 at a distance such that the sensors 136, 138 do not adversely impact the fluid flow and flow profile through the flow meter 101.

The flow metering system 300 also includes a flow conditioner 302 and a pressure sensor 304 fluidically coupled to the ultrasonic meter 101. The flow conditioner 302 is disposed upstream of the ultrasonic meter 101 and the pressure sensor 304 is disposed upstream of the flow conditioner 302. The distance between the ultrasonic meter 101 and the flow conditioner 302 may be specified by the manufacturer of the flow meter 101 and/or the flow conditioner 302. The flow conditioner 302 reduces swirl, turbulence, etc. in the fluid stream provided to the ultrasonic meter 101, thereby providing a fully developed flow profile in the fluid stream flowing through the ultrasonic meter 101. Some embodiments of the flow conditioner 302 condition the fluid flow by directing the fluid stream through a series of small apertures. The apertures of the flow conditioner 302 can be blocked by fluid contaminates in the fluid stream.

As previously explained, the pressure and temperature of the fluid proximate the flow meter 101 are used in flow computations to correct ultrasonic meter body cross-sectional area pressure and temperature, metering volume correction to standard conditions, and other metering calculations. The fluid pressure and fluid temperature proximate the flow meter 101, as measured by the pressure sensor 136 and the temperature sensor 138 are herein respectively designated "meter pressure" and "meter temperature." Meter pressure and meter temperature should have high accuracy, and be verified to ensure that overall metering uncertainty is not adversely affected by mismeasurement in the sensors 136, 138.

Similarly, fluid pressure upstream of the flow conditioner 302, as measured by the pressure sensor 304, is termed "conditioner pressure." Pressure measurement values provided by the sensors 136, 304 are provided to the condition monitor 128. The condition monitor 128 may determine the pressure drop across the flow conditioner 302 as:

$$\text{Conditioner Pressure Drop} = \text{Conditioner Pressure} - \text{Meter Pressure} \quad (1)$$

The pressure drop across the flow conditioner 302 is dependent on Reynolds number. Therefore, the condition monitor 128 may determine reference values of the pressure differential (Conditioner Pressure Drop) with respect to Reynolds Number or other flow characteristic, such as fluid velocity, where fluid pressure and temperature are held to be relatively stable. Once the reference pressure differential values are established, the condition monitor 128 may apply the reference differential values to determine whether the flow conditioner 302 may be blocked based on the current differential pressure exceeding a differential pressure threshold relative to the reference. The condition monitor 128 may generate an alarm indicating that a potential blockage of the flow conditioner 302 has been detected.

The condition monitor 128 can also compute a secondary fluid stream pressure that corrects the conditioner pressure to meter conditions. The secondary fluid stream pressure may be computed as:

$$\text{Secondary Meter Pressure} = \text{Conditioner Pressure} - \text{Reference Differential Pressure} \quad (2)$$

The condition monitor 128 compares the meter pressure to the secondary meter pressure. Where the difference between the meter pressure and the secondary meter pressure exceeds a predetermined threshold value, the condition monitor 128 may generate an alarm indicating that verification of one or more of the pressure sensors 136, 304 should be performed. The threshold may be set in accordance with local, national, international standards that establish allowable uncertainty for the pressure measurement based on the type of metering application being performed.

Similarly, in some embodiments, the condition monitor 128 may compute a secondary conditioner pressure based on the meter pressure and reference differential pressure value. The secondary conditioner pressure may be computed as:

$$\text{Secondary Conditioner Pressure} = \text{Meter Pressure} + \text{Reference Differential Pressure}, \quad (3)$$

and compared to the measured conditioner pressure. If the difference between the conditioner pressure and the secondary conditioner pressure exceeds a predetermined threshold value, the condition monitor 128 may generate an alarm indicating that verification of one or more of the pressure sensors 136, 304 should be performed. The threshold may be set in accordance with local, national, international standards that establish allowable uncertainty for the pressure measurement based on the type of metering application being performed.

Figure 4:
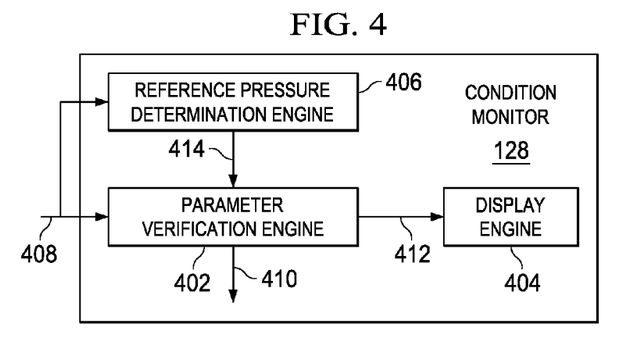
FIG. 4 shows a block diagram of a condition monitoring system in accordance with various embodiments.

FIG. 4 shows a block diagram of the condition monitor 128 in accordance with various embodiments. The condition monitor 128 includes a parameter verification engine 402, a reference pressure determination engine 406, and a display engine 404. The parameter verification engine 402 acquires values of various operational parameters 408 from the ultrasonic meter 101, the sensors 134-138, 304 etc. and processes the parameter values to identify changes in operation of the metering system 300 that may be indicative of potential flow measurement inaccuracy or other deviations from expected operation. Embodiments of the parameter verification engine 402 may acquire and process values of parameters 408, where the parameters 408 include gains applied to ultrasonic transducers for detection of ultrasonic signals, flow profile factor, flow symmetry, crossflow, flow swirl, chordal signal-to-noise ratios, pressure and temperature measurements, etc.

The reference pressure determination engine 406 computes reference pressure differential values 414 for the pressure sensors 136, 304. The reference pressure differential values may be determined with respect to the Reynolds number or velocity of fluid flowing through the flow metering system 300. The reference pressure differential values may be determined, for example, as an average of Conditioner Pressure Drop values over an initialization interval with respect to Reynolds number or velocity. The reference pressure determination engine 406 provides the reference pressure differential values 414 to the parameter verification engine 402.

Some embodiments of the condition monitor 128 include a Reynolds number engine that computes Reynolds numbers for fluid flowing through the flow metering system 300 at times corresponding to the acquisition of the values of the parameter 408. As explained above, the Reynolds numbers may be applied with reference to the pressure measurements provided by the pressure sensors 136, 304. In some embodiments, the condition monitor 128 may receive the Reynolds numbers from a different system. The Reynolds number engine may compute the Reynolds numbers based on measured parameters of the fluid flowing through the flow meter 101 provided by the flow meter 101 and transducers 134-138.

The parameter verification engine 402 computes current values of Conditioner Pressure Drop and Secondary Meter Pressure and compares the current values to threshold values. A current value of Conditioner Pressure Drop is compared to a threshold that is based on the reference pressure differential values 414. The threshold defines a range of allowable difference between the reference pressure differential 414 and the current value of Conditioner Pressure Drop. The threshold may be based on the range of observed differences over time, a predetermined range value, etc.

A current value of difference between meter pressure and Secondary Meter Pressure is compared to a threshold defining a maximum allowable difference between the current meter pressure and the Secondary Meter Pressure. The threshold may be based on the range of observed differences between the meter pressure and the Secondary Meter Pressure over time, a predetermined range value, etc.

Some embodiments of the condition monitor 128 may include separate alarm thresholds for meter pressure, Secondary Meter Pressure, and Conditioner Pressure Drop. In other embodiments, a single alarm threshold may be applied to indicate that the flow conditioner 302 may be blocked, or that pressure sensors 136, 304 should be verified.

The meter pressure/Secondary Meter Pressure and Conditioner Pressure Drop thresholds define ranges within which values of each parameter are considered to indicate that the flow metering system 300 is operating properly. Conversely, values of the parameter falling outside the range defined by the thresholds may indicate that the flow metering system 300 is not operating properly. The parameter verification engine 402 may generate an alarm 410 based on the difference between meter pressure and Secondary Meter Pressure, or Conditioner Pressure Drop and the reference pressure differential values 414 exceeding the corresponding threshold values.

The condition monitor 128 may also determine whether a systematic bias, based, for example, on site characteristics, is present between the pressure sensors 136 304. The condition monitor 128 can quantify the systematic bias and adjust the measurements provided by the pressure sensors 136, 304, and/or the difference between the measured pressures in accordance with the systematic bias to improve measurement accuracy.

The display engine 404 generates displays for presentation of information provided by the parameter verification engine 402 to a user. For example, the display engine 404 may generate a display of values of a selected operational parameter of the ultrasonic meter 101 that have triggered an alarm with corresponding velocities, Reynolds numbers, thresholds, and other information disclosed herein. The display engine 404 may present the display via a monitor as is known in the art (e.g., a flat panel monitor), a printer, or other display device.

Embodiments of the parameter verification engine 402, the reference pressure determination engine 406, the display engine 404, and other engines disclosed herein may include hardware resources or hardware and software resources (i.e., instructions) to perform the functions disclosed herein. For example, some embodiments of the parameter verification engine 402, the reference pressure determination engine 406, and the display engine 404 may be implemented as one or more processors executing instructions retrieved from a computer-readable storage medium. Processors suitable for implementing the engines 402, 404, 406 may include general-purpose microprocessors, digital signal processors, microcontrollers, or other devices capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. A non-transitory computer-readable storage medium suitable for storing instructions of the engines 402, 404, 406 may include volatile storage such as random access memory, non-volatile storage (e.g., a hard drive, an optical storage device (e.g., CD or DVD), FLASH storage, read-only-memory), or combinations thereof.

Some embodiments of the parameter verification engine 402, the reference pressure determination engine 406, the display engine 404, and other engines or portions of the condition monitor 128 disclosed herein may be implemented as hardware circuitry configured to perform the functions disclosed herein. Selection of a hardware or processor/instruction implementation of embodiments is a design choice based on a variety of factors, such as cost, time to implement, and the ability to incorporate changed or additional functionality in the future.

Figure 5:
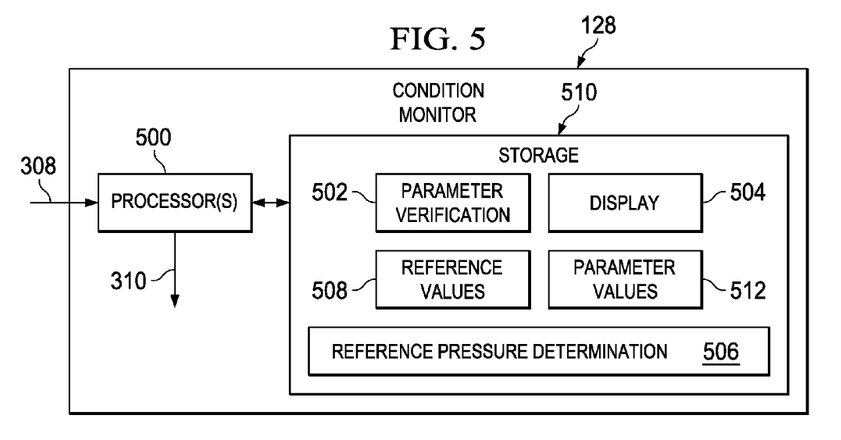
FIG. 5 shows a block diagram of a processor-based embodiment of a condition monitor in accordance with various embodiments.

FIG. 5 shows a block diagram of a processor-based embodiment of the condition monitor 128. The embodiment of the condition monitor 128 shown in FIG. 5 includes a processor 500 and storage 510 coupled to the processor 500. The processor 500 is an instruction execution device as described above. The storage 510 is a computer-readable medium as described above. The processor 500 retrieves and executes instructions stored in the storage 510, reads data from the storage 510, writes data to the storage 510, and communicates with other systems and devices. The storage 510 includes a parameter verification module 502, a reference pressure determination module 506, and a display module 504 which respectively include instructions for implementing the parameter verification engine 402, the reference pressure determination engine 406, and the display engine 404. The storage 510 may also include processed and/or unprocessed parameter values 512 (e.g., transducer gain values, profile factor values, Reynolds number values, alarm information, meter pressure values, conditioner pressure values, etc.), and reference values 508 that correspond to the reference pressure differential values 414, threshold values, etc. The processor-based condition monitor 128 shown in FIG. 5 may include various other components, such as network adapters, video interfaces, peripheral interfaces, etc. that have been omitted from FIG. 5 in the interest of clarity.

Figure 6:
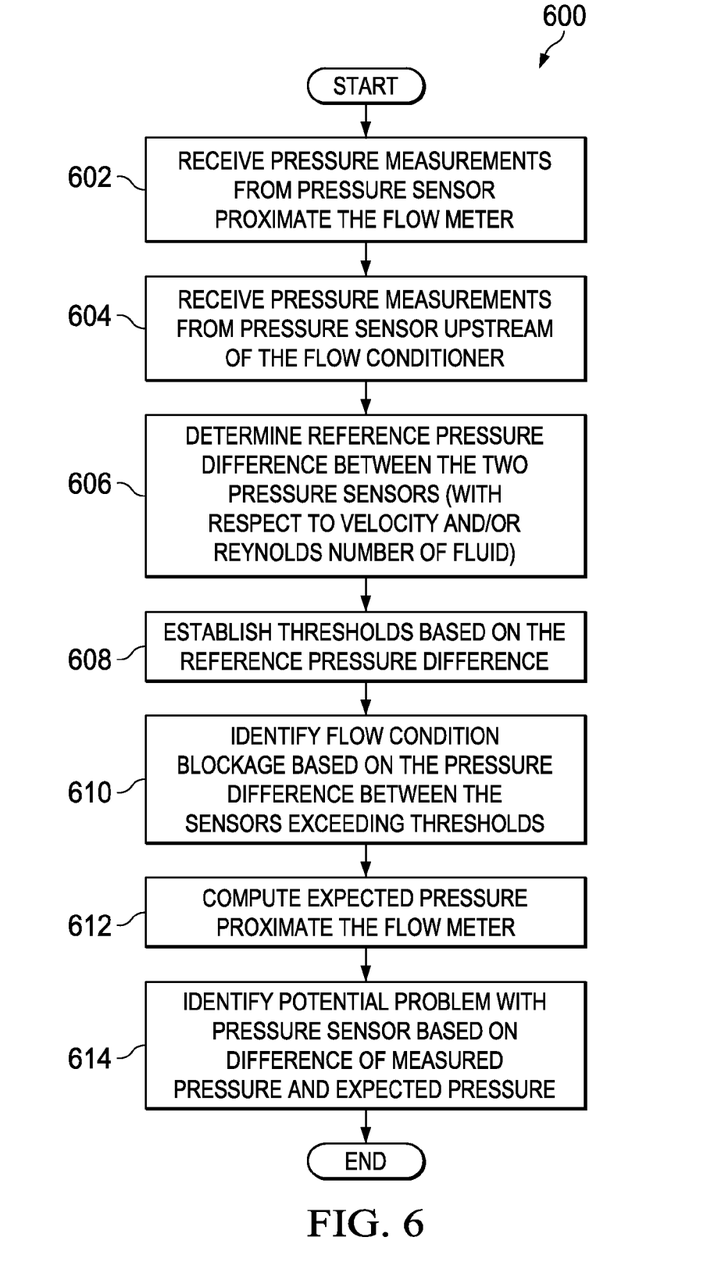
FIG. 6 shows a flow diagram for a method for monitoring the condition of an ultrasonic flow metering system in accordance with various embodiments.

FIG. 6 shows a flow diagram for a method 600 for monitoring the condition of an ultrasonic flow metering system 300 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be implemented as instructions stored in computer readable medium 510 and executed by the processor 500.

In block 602, fluid is flowing through the ultrasonic flow metering system 300, and the system 300 is measuring the volume of the fluid. The condition monitor 128 acquires values of fluid pressure from the pressure sensor 136 disposed proximate to the ultrasonic flow meter 101.

In block 604, the condition monitor 128 acquires values of fluid pressure from the pressure sensor 304 disposed upstream of the flow conditioner 302.

In block 606, the condition monitor 128 determines a reference pressure difference value corresponding to the difference in pressures measured by the sensor 136 and the sensor 304. The reference pressure difference value may be determined with respect to velocity and/or Reynolds number of the fluid flowing through the system 300 when pressure values are measured by the sensors 136, 304. Thus, a reference pressure difference value may express a nominal or expected difference in pressure measurements between the sensors 136, 306 at a given fluid velocity or Reynolds number.

In block 608, the condition monitor 128 establishes thresholds with respect to the reference pressure difference value. The thresholds indicate a range of acceptable difference between meter pressure and conditioner pressure at a respective Reynolds number, velocity, etc. The thresholds may be determined based on a predetermined range deemed nominal (as expected) at the Reynolds number, velocity or other reference parameter corresponding to each value of the pressure difference.

In block 610, the condition monitor 128 determines whether a blockage may be present in the flow conditioner 302. The condition monitor 128 identifies a potential blockage by comparing a current value of the difference between meter pressure and conditioner pressure to the reference pressure difference value. The reference pressure difference value may correspond to a fluid Reynolds number or velocity at the time the pressure values used to compute the current value of the difference were acquired. If the current value of the difference exceeds the threshold, (i.e., the pressure differential between the sensors 136, 302 has increased more than a predetermined amount) then the flow conditioner 302 may be blocked. The condition monitor 128 may generate an alarm indicating that the flow conditioner 302 may be blocked based on results of the comparison. In some embodiments, alarm generation may be further based on the conditioner pressure corresponding to the current value of the difference having increased relative previous pressure measurements provided by the sensor 304.

In block 612, the condition monitor 128 determines the expected fluid pressure proximate to the ultrasonic flow meter 101. The condition monitor 128 may determine the expected pressure based on the pressure measured upstream of the flow conditioner 302 by the pressure sensor 304 and the computed reference pressure difference value in accordance with equation (2). The condition monitor 128 may also establish thresholds with respect to the difference between the current value of the meter pressure and the expected fluid pressure proximate to the meter 101. The thresholds indicate a range of acceptable difference between meter pressure and expected pressure at a respective Reynolds number, velocity, etc. The thresholds may be determined based on a predetermined pressure difference value deemed nominal (as expected) at the Reynolds number, velocity or other reference parameter corresponding to each value of the meter pressure.

In block 614, the condition monitor 128 determines whether one of the pressure sensors 136, 304 may be malfunctioning or subject to pressure measurement error. The condition monitor 128 identifies a potential sensor problem by comparing a current value of the meter pressure and the expected fluid pressure proximate to the ultrasonic flow meter 101. If the difference between the current value of the meter pressure and the expected fluid pressure proximate to the meter 101 exceeds the threshold, then at least one of the sensors 136, 304 may be experiencing a problem. The condition monitor 128 may generate an alarm indicating a potential problem with the sensors 136, 304 based on the comparison.

The above discussion is meant to be illustrative of the principles and various exemplary embodiments of the present invention. Numerous variations and modifications will become apparent to those skilled in the art once the above disclosure is fully appreciated. For example, while embodiments of the invention have been described with regard to an ultrasonic flow meter, those skilled in the art understand that embodiments are equally applicable to other types of flow meters. It is intended that the following claims be interpreted to embrace all such variations and modifications.

What is claimed is:

1. A flow metering system, comprising:
a flow meter configured to measure volume of fluid flowing through the flow meter;
a first pressure sensor disposed proximate the flow meter to measure pressure of the fluid proximate the flow meter;
a flow conditioner disposed upstream of the flow meter;
a second pressure sensor disposed upstream of the flow conditioner to measure pressure of the fluid upstream of the flow conditioner; and
a condition monitor coupled to the flow meter and the pressure sensors, and configured to identify a potential discrepancy in operation of the flow metering system based on a difference between pressure measurements of the first and second pressure sensors.

2. The system of claim 1, wherein the condition monitor is configured to establish a reference pressure difference between the first and second pressure sensors.

3. The system of claim 2, wherein the condition monitor is configured to establish the reference pressure difference based on differences between pressure measurements of the first and second pressure sensors with respect to at least one of Reynolds number and velocity of the fluid.

4. The system of claim 2, wherein the condition monitor is configured to generate an alarm indicative of a blockage of the flow conditioner based on a pressure difference between the first and second pressure sensors exceeding the reference pressure difference by more than a predetermined amount.

5. The system of claim 4, wherein the condition monitor is configured to generate the alarm based on an increase in pressure measured by the second pressure sensor.

6. The system of claim 2, wherein the condition monitor is configured to compute an expected value of pressure proximate the flow meter based on the reference pressure and the pressure measured by the second pressure sensor.

7. The system of claim 6, wherein the condition monitor is configured to generate an alarm indicative of a problem with at least one of the first pressure sensor and the second pressure sensor based on the pressure measured by the first pressure sensor differing from the expected value by more than a predetermined amount.

8. A method for monitoring operation of a flow metering system, comprising:
receiving pressure measurements from a first pressure sensor disposed proximate a flow meter;
receiving pressure measurements from a second pressure sensor disposed upstream of a flow conditioner that conditions a fluid stream provided to the flow meter;
establishing a reference pressure difference between the first and second pressure sensors; and
identifying a potential discrepancy in operation of the flow metering system based on the reference pressure difference and pressure measurements received from the first and second pressure sensors.

9. The method of claim 8, wherein the establishing comprises determining the reference pressure difference based on differences between pressure measurements of the first and second pressure sensors with respect to at least one of Reynolds number and velocity of fluid of the fluid stream.

10. The method of claim 8, wherein the identifying comprises generating an alarm indicative of a blockage of the flow conditioner based on a pressure difference between the first and second pressure sensors exceeding the reference pressure difference by more than a predetermined amount.

11. The method of claim 10, wherein the identifying comprises generating the alarm based on an increase in pressure measured by the second pressure sensor.

12. The method of claim 8, further comprising computing an expected value of pressure proximate the flow meter based on the reference pressure and the pressure measured by the second pressure sensor.

13. The method of claim 12, wherein the identifying comprises generating an alarm indicative of a problem with at least one of the first and second pressure sensors based on the pressure measured by the first pressure sensor differing from the expected value by more than a predetermined amount.

14. A condition monitoring system for monitoring operation of a flow metering system, comprising:
a reference pressure determination engine configured to:
acquire pressure measurements from a first pressure sensor disposed proximate a flow meter;
acquire pressure measurements from a second pressure sensor disposed upstream of a flow conditioner that conditions a fluid stream provided to the flow meter; and
establish a reference pressure difference between the first and second pressure sensors based on the pressure measurements; and
a parameter verification engine configured to identify a potential discrepancy in operation of the flow metering system based on the reference pressure difference and pressure measurements received from the first and second pressure sensors.

15. The system of claim 14, wherein the reference pressure determination engine is configured to establish the reference pressure difference based on differences between pressure measurements of the first and second pressure sensors with respect to Reynolds number of fluid of the fluid stream.

16. The system of claim 14, wherein the reference pressure determination engine is configured to establish the reference pressure difference based on differences between pressure measurements of the first and second pressure sensors with respect to velocity of the fluid stream.

17. The system of claim 14 wherein the parameter verification engine is configured to identify a potential blockage of the flow conditioner based on a pressure difference between the first and second pressure sensors exceeding the reference pressure difference by more than a predetermined amount.

18. The system of claim 17, wherein the parameter verification engine is configured to identify the potential blockage based on an increase in pressure measured by the second pressure sensor.

19. The system of claim 14, wherein the reference pressure determination engine is configured to compute an expected value of pressure proximate the flow meter based on the reference pressure and the pressure measured by the second pressure sensor.

20. The system of claim 19, wherein the parameter verification engine is configured to identify a potential problem with at least one of the first and second pressure sensors based on the pressure measured by the first pressure sensor differing from the expected value by more than a predetermined amount.

* * * * *